United States Patent
Paul et al.

(10) Patent No.: US 11,614,839 B2
(45) Date of Patent: Mar. 28, 2023

(54) BALANCED MUTUAL CAPACITANCE SYSTEMS AND METHODS

(71) Applicant: Apple Inc., Cupertino, CA (US)

(72) Inventors: William Matthew Pender Paul, San Francisco, CA (US); Christoph H. Krah, Cupertino, CA (US); Bin Huang, San Jose, CA (US); Stanley Bo-Ting Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 16/998,456

(22) Filed: Aug. 20, 2020

(65) Prior Publication Data
US 2022/0057897 A1  Feb. 24, 2022

(51) Int. Cl.
*G06F 3/044* (2006.01)
*G06F 3/041* (2006.01)

(52) U.S. Cl.
CPC ........ *G06F 3/0445* (2019.05); *G06F 3/04164* (2019.05)

(58) Field of Classification Search
CPC ............................ G06F 3/04164; G06F 3/0445
USPC ........................................................ 345/173
See application file for complete search history.

(56) References Cited

U.S. PATENT DOCUMENTS

| | | | |
|---|---|---|---|
| 8,106,668 B2 | 1/2012 | Matsushima | |
| 9,158,407 B2 | 10/2015 | Coulson et al. | |
| 9,727,187 B2 | 8/2017 | Slamkul et al. | |
| 9,904,398 B2 | 2/2018 | Yang et al. | |
| 10,558,305 B2 | 2/2020 | Roberts | |
| 2010/0194707 A1* | 8/2010 | Hotelling | G06F 3/0412 345/55 |
| 2014/0267067 A1 | 9/2014 | Fuller et al. | |
| 2016/0266679 A1 | 9/2016 | Shahparnia et al. | |
| 2016/0306456 A1* | 10/2016 | Slamkul | G06F 3/0418 |
| 2016/0342265 A1* | 11/2016 | Geaghan | G06F 3/0446 |
| 2017/0090619 A1 | 3/2017 | Yousefpor et al. | |
| 2018/0088706 A1 | 3/2018 | Tanemura et al. | |
| 2018/0373393 A1* | 12/2018 | Lerner | G06F 3/0488 |
| 2019/0056834 A1* | 2/2019 | Blondin | G06F 3/041662 |
| 2019/0179446 A1 | 6/2019 | Kremin et al. | |
| 2019/0265857 A1* | 8/2019 | Chou | G06F 3/04164 |
| 2020/0026377 A1 | 1/2020 | Gwon et al. | |
| 2020/0233531 A1 | 7/2020 | Weinerth et al. | |

* cited by examiner

*Primary Examiner* — Mark Edwards
(74) *Attorney, Agent, or Firm* — Kubota & Basol LLP

(57) ABSTRACT

In some examples, a touch screen can include touch electrodes that can function as drive (Tx) electrodes and sense (Rx) electrodes during a touch sensing operation of the electronic device. The drive electrodes can include +Tx electrodes and −Tx electrodes that can receive drive signals that can have the same amplitude and frequency and opposite phases, for example. In some examples, the surface areas of the +Tx electrodes and the −Tx electrodes can be the same and the distances of the +Tx electrodes and −Tx electrodes from the Rx electrodes can be different. In some examples, the total charge coupled to a proximate or touching object can be zero, which can mitigate problems associated with ungrounded or poorly grounded objects in contact with the touch screen.

21 Claims, 11 Drawing Sheets

BALANCED MUTUAL CAPACITANCE SYSTEMS AND METHODS

FIELD OF THE DISCLOSURE

This relates generally to capacitive touch sensors and, more specifically, to mutual capacitance touch sensing techniques that include balanced drive signals.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some examples, a poorly grounded object touches or is proximate to a touch sensor panel. In some situations, the touch sensor panel may be unable to detect the poorly grounded object or the poorly grounded object can cause errors in the touch data, such as a "negative pixel effect" by coupling charge from the object to one or more sense electrodes of the touch sensor panel. In some examples, poor grounding can be mitigated using one or more algorithms applied to the sensed touch data. In some examples, poor grounding can be mitigated through the design of the touch sensor panel and/or the touch scans performed at the touch sensor panel.

BRIEF SUMMARY OF THE DISCLOSURE

Embodiments described herein relate generally to capacitive touch sensors and, more specifically, to mutual capacitance touch sensing techniques that include balanced drive signals. In some examples, a touch screen can include a plurality of touch electrodes that can function as drive (Tx) electrodes and sense (Rx) electrodes during a touch sensing operation of the electronic device. The drive electrodes can include +Tx electrodes and −Tx electrodes that can receive drive signals that can have the same amplitude and frequency and opposite phases, for example. In some examples, the surface areas of the +Tx electrodes and the −Tx electrodes can be the same and the distances of the +Tx electrodes and −Tx electrodes from the Rx electrodes can be different. In some examples, the total charge coupled to a proximate or touching object can be zero, which can mitigate problems associated with ungrounded or poorly grounded objects in contact with the touch screen. In some examples, the net capacitive coupling of the +Tx electrodes and −Tx electrodes with the Rx electrodes can be non-zero, allowing touch to be detected by detecting changes in the net mutual capacitances between the +Tx electrodes and Rx electrodes and between the −Tx electrodes and Rx electrodes.

A variety of arrangements of +Tx, −Tx, and Rx electrodes can be used, for example. In some examples, each respective touch node of the touch screen can include an Rx electrode, a +Tx electrode, and a −Tx electrode. For example, each touch node can include one or more Rx electrodes at least partially surrounded by one or more +Tx electrodes, which can be at least partially surrounded by one or more −Tx electrodes. In some examples, the touch screen can include rows and columns of drive and sense electrodes with touch nodes defined as the intersections of the rows and columns. For example, the Rx electrodes can be disposed in rows and the +Tx electrodes and −Tx electrodes can be disposed in columns, wherein the +Tx electrodes can surround the −Tx electrodes. As another example, a touch sensor that includes one touch node can include one or more +Tx electrodes located between one or more Rx electrodes and one or more −Tx electrodes.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Embodiments described herein relate generally to capacitive touch sensors and, more specifically, to mutual capacitance touch sensing techniques that include balanced drive signals. In some examples, a touch screen can include a plurality of touch electrodes that can function as drive (Tx) electrodes and sense (Rx) electrodes during a touch sensing operation of the electronic device. The drive electrodes can include +Tx electrodes and −Tx electrodes that can receive drive signals that can have the same amplitude and frequency and opposite phases, for example. In some examples, the surface areas of the +Tx electrodes and the −Tx electrodes can be the same and the distances of the +Tx electrodes and −Tx electrodes from the Rx electrodes can be different. In some examples, the total charge coupled to a proximate or touching object can be zero, which can mitigate problems associated with ungrounded or poorly grounded objects in contact with the touch screen. In some examples, the net capacitive coupling of the +Tx electrodes and −Tx electrodes with the Rx electrodes can be non-zero, allowing touch to be detected by detecting changes in the net mutual capacitances between the +Tx electrodes and Rx electrodes and between the −Tx electrodes and Rx electrodes.

A variety of arrangements of +Tx, −Tx, and Rx electrodes can be used, for example. In some examples, each respective touch node of the touch screen can include an Rx electrode, a +Tx electrode, and a −Tx electrode. For example, each touch node can include one or more Rx electrodes at least partially surrounded by one or more +Tx electrodes, which can be at least partially surrounded by one or more −Tx electrodes. In some examples, the touch screen can include rows and columns of drive and sense electrodes with touch nodes defined as the intersections of the rows and columns. For example, the Rx electrodes can be disposed in rows and the +Tx electrodes and −Tx electrodes can be disposed in columns, wherein the +Tx electrodes can surround the −Tx electrodes. As another example, a touch sensor that includes one touch node can include one or more +Tx electrodes located between one or more Rx electrodes and one or more −Tx electrodes.

Figure 1A:
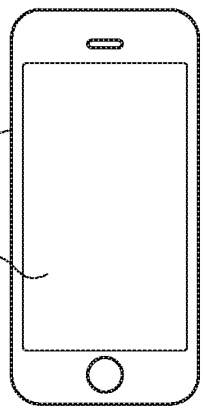
FIGS. 1A-1H illustrate example systems that can use balanced mutual capacitance techniques according to examples of the disclosure.
Figure 1B:
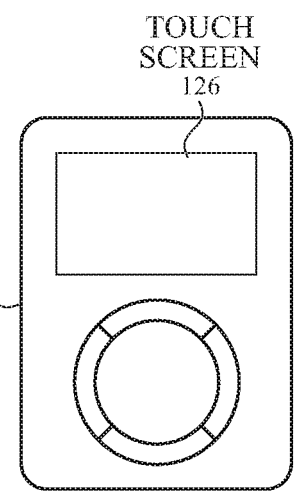
Figure 1C:
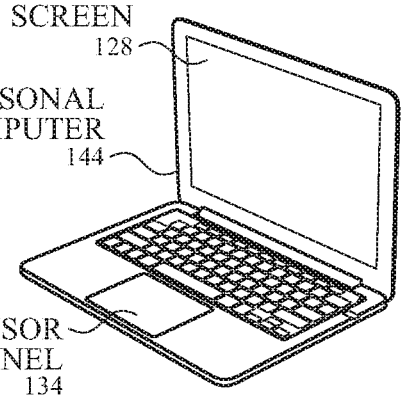
Figure 1D:
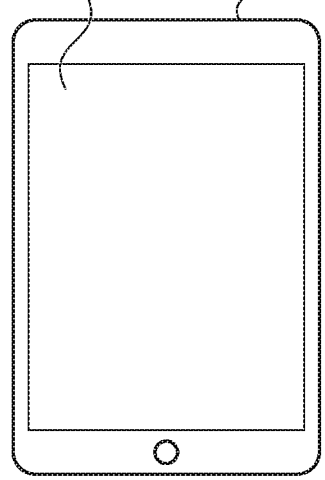
Figure 1E:
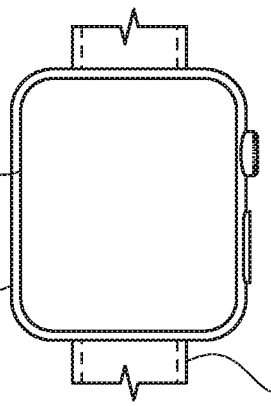
Figure 1F:
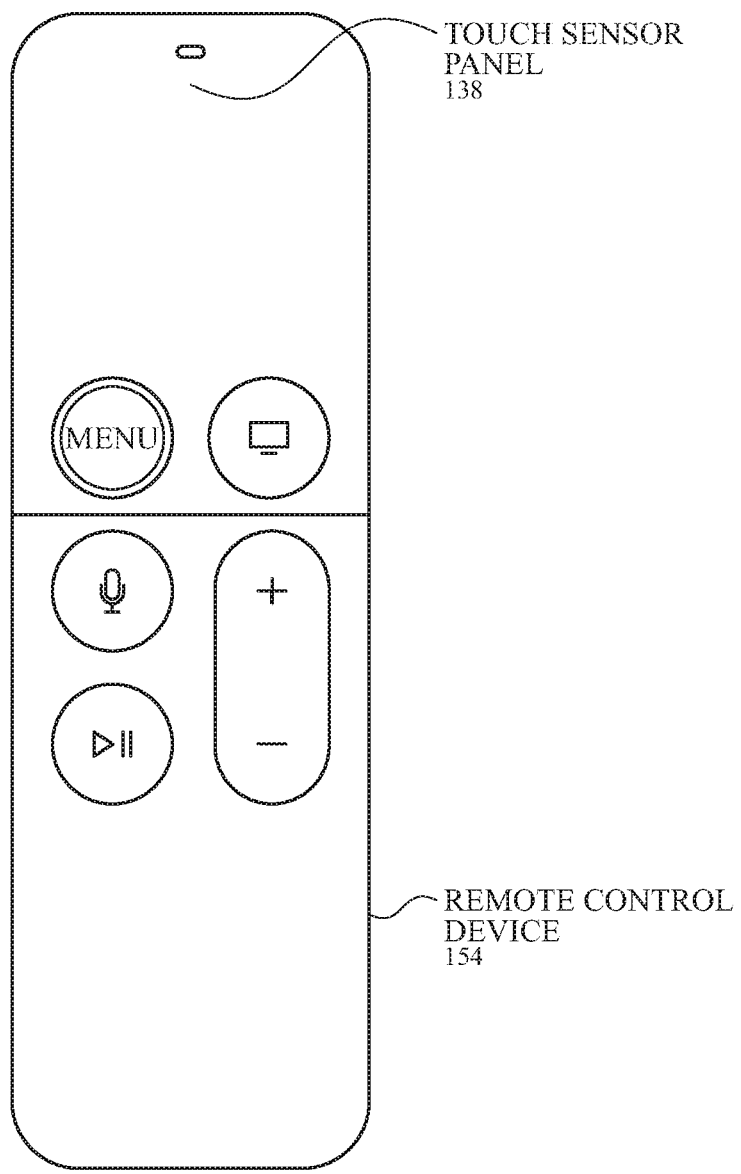
Figure 1G:
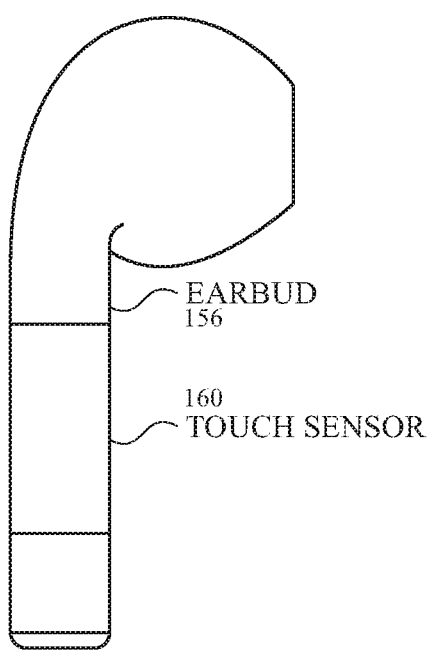
Figure 1H:
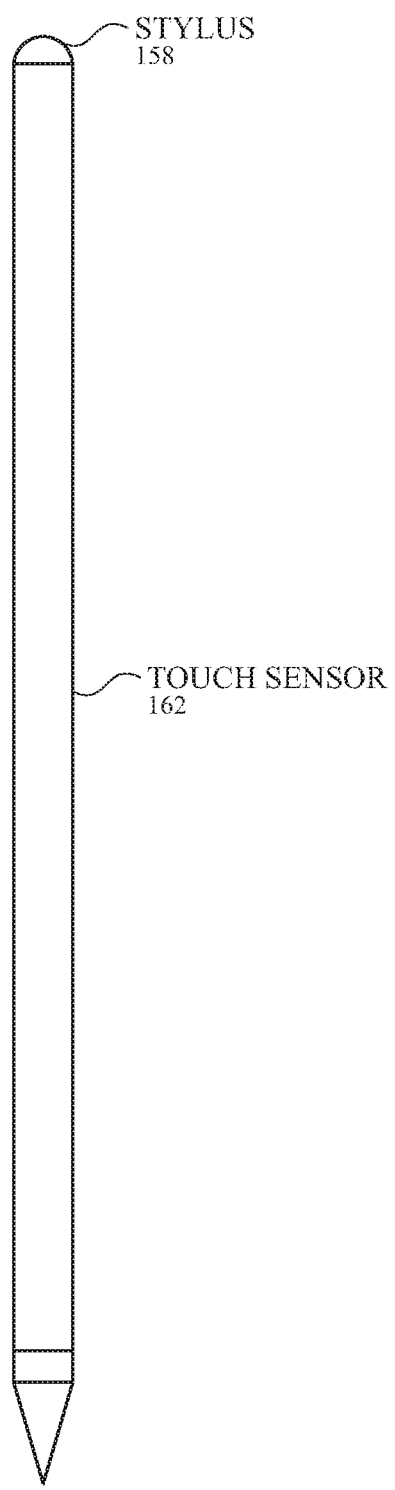

FIGS. 1A-1H illustrate example systems that can use balanced mutual capacitance techniques according to examples of the disclosure. FIG. 1A illustrates an example mobile telephone 136 that includes a touch screen 124 that can use balanced mutual capacitance techniques according to examples of the disclosure. FIG. 1B illustrates an example digital media player 140 that includes a touch screen 126 that can use balanced mutual capacitance techniques according to examples of the disclosure. FIG. 1C illustrates an example personal computer 144 that includes a touch screen 128 and a touch sensor panel 134 (e.g., a trackpad) that can use balanced mutual capacitance techniques according to examples of the disclosure. FIG. 1D illustrates an example tablet computing device 148 that includes a touch screen 130 that can use balanced mutual capacitance techniques according to examples of the disclosure. FIG. 1E illustrates an example wearable device 150 that includes a touch screen 132 and can be attached to a user using a strap 152 and that can use balanced mutual capacitance techniques according to examples of the disclosure. FIG. 1F illustrates an example remote control device 154 that includes a touch sensor panel 138 that can use balanced mutual capacitance techniques according to examples of the disclosure. FIG. 1G illustrates an example earbud 156 that includes a touch sensor 160 that can use balanced mutual capacitance techniques according to examples of the disclosure. FIG. 1H illustrates an example stylus 158 that includes a touch sensor 162 that can use balanced mutual capacitance techniques according to examples of the disclosure. It is understood that a touch screen and balanced mutual capacitance techniques can be implemented in other devices, including future devices not yet in the marketplace. Additionally, it should be understood that although the disclosure herein primarily focuses on touch screens, the disclosure of balanced mutual capacitance techniques can be implemented for devices including touch sensor panels (and displays) that may not be implemented as a touch screen.

In some examples, touch screens 124, 126, 128, 130 and 132, touch sensor panels 134 and 138 and touch sensors 160 and 162 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can support multi-touch, single touch, projection scan, etc., touch functionality.

In some examples, touch screens 124, 126, 128, 130 and 132, touch sensor panels 134 and 138 and touch sensors 160 and 162 can be based on mutual capacitance. A mutual capacitance based touch system can include electrodes arranged as drive and sense lines (e.g., as described below with reference to FIG. 4A) that may cross over each other on different layers (in a double-sided configuration) or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132, touch sensor panels 134 and 138, and touch sensors 160 and 162 can be based on mutual capacitance and/or self-capacitance. The electrodes can be arrange as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation, electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
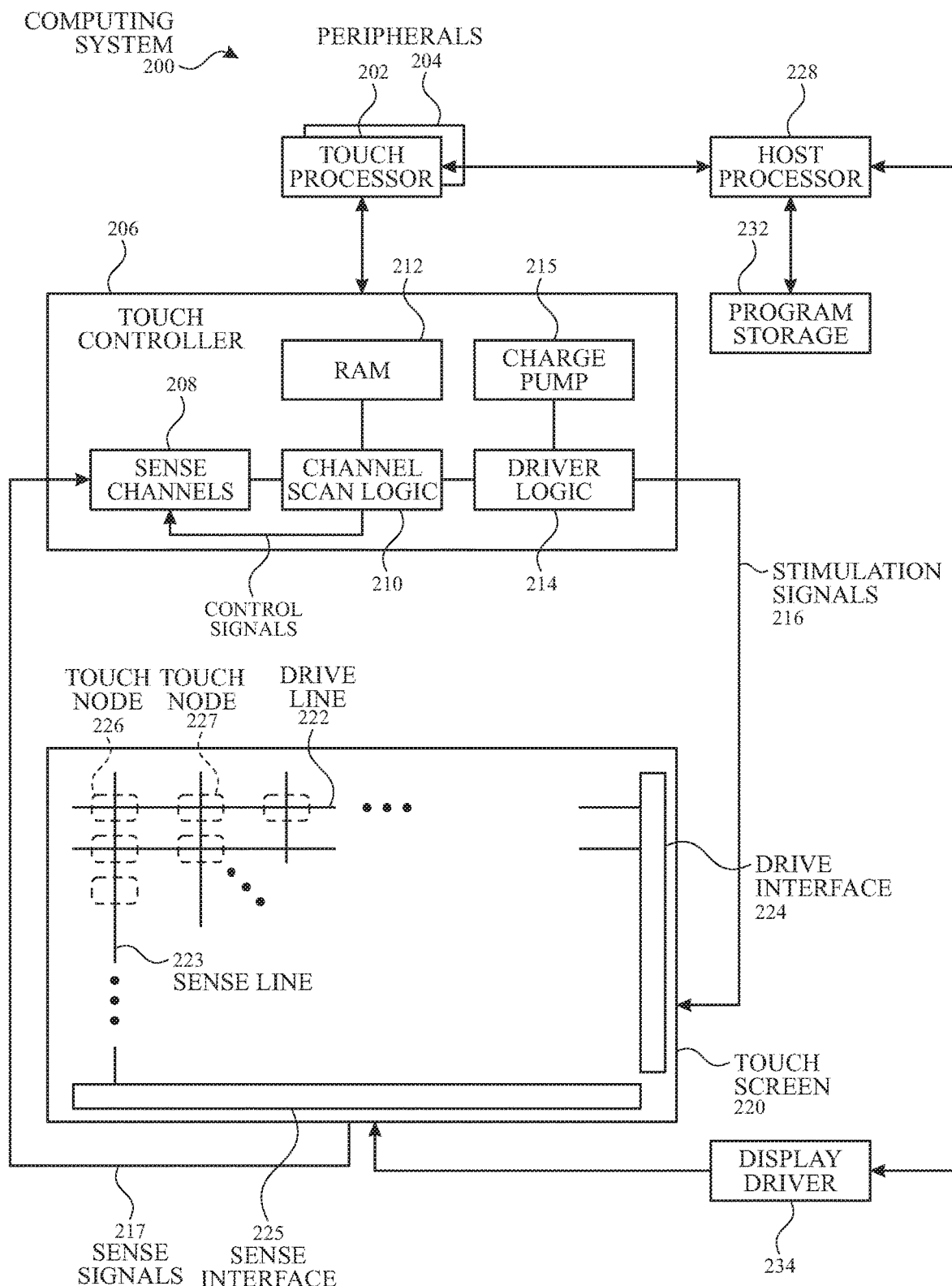
FIG. 2 illustrates an example computing system including a touch screen that can use balanced mutual capacitance techniques according to examples of the disclosure.

FIG. 2 illustrates an example computing system including a touch screen that can use balanced mutual capacitance techniques according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers, co-processor(s) and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, capturing an image with a camera in communication with the electronic device, exiting an idle/sleep state of the electronic device, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224 and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
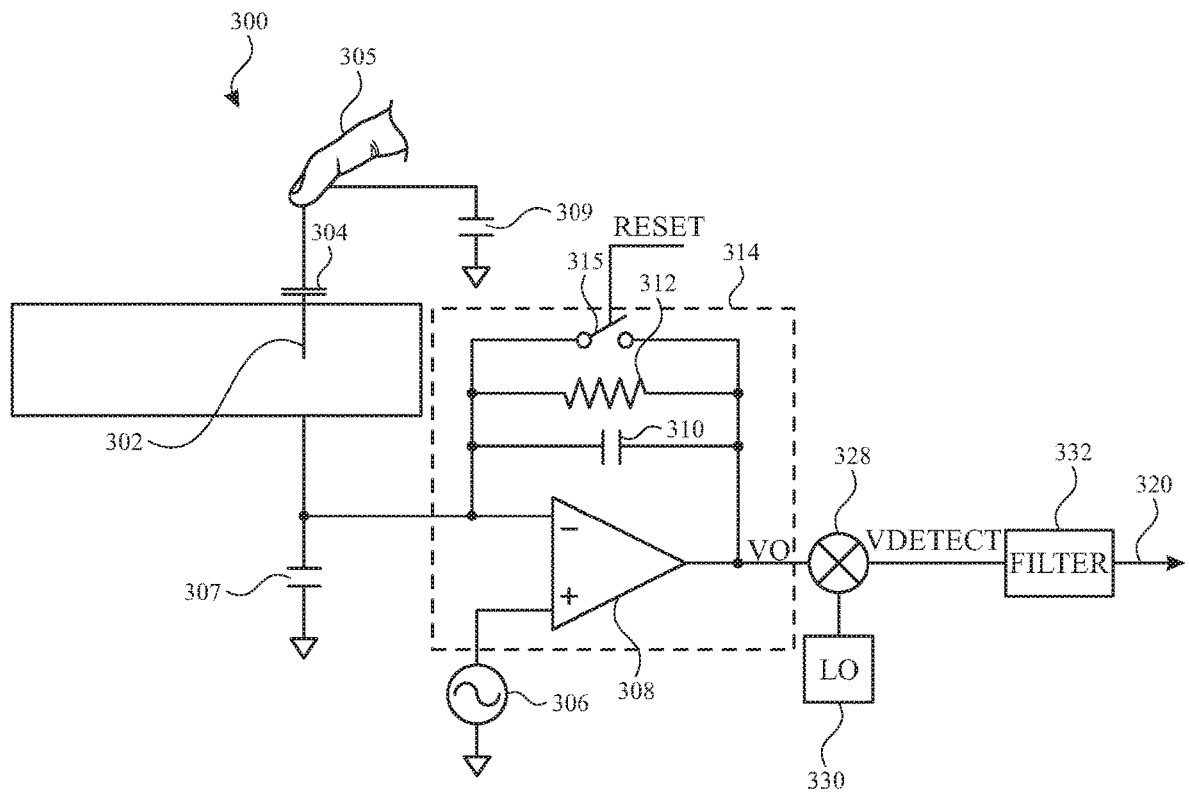
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be approximated as capacitance 304 as capacitance 304 can be much smaller than the body capacitance 309 and thus can dominate the overall ground capacitance. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. The output voltage amplitude of amplifier 308 is approximately $V_{ac}*(1+X_{FB}/(X_{CS}+X_{CSNS}))$, where $X_{FB}$, $X_{CS}$ and $X_{CSNS}$ are the impedances of the feedback network, capacitors 307 and 304, respectively, at the frequency of $V_{ac}$. The output of the amplifier 308 can be demodulated at the frequency of stimulus signal $V_{ac}$ (homodyne or synchronous detection) by demodulator 328 and then integrated (or averaged) by filter 332. The resulting output 320 can be used by a processor to determine the presence of a proximity or touch event, or the output can be inputted into a discrete logic network to determine the presence of a proximity or touch event. Note that in some examples, demodulator can be an I/Q demodulator. In some examples, the demodulator can be in the digital domain, where the output of amplifier 308 could be digitized first by an ADC before performing digital demodulation.

Figure 3B:
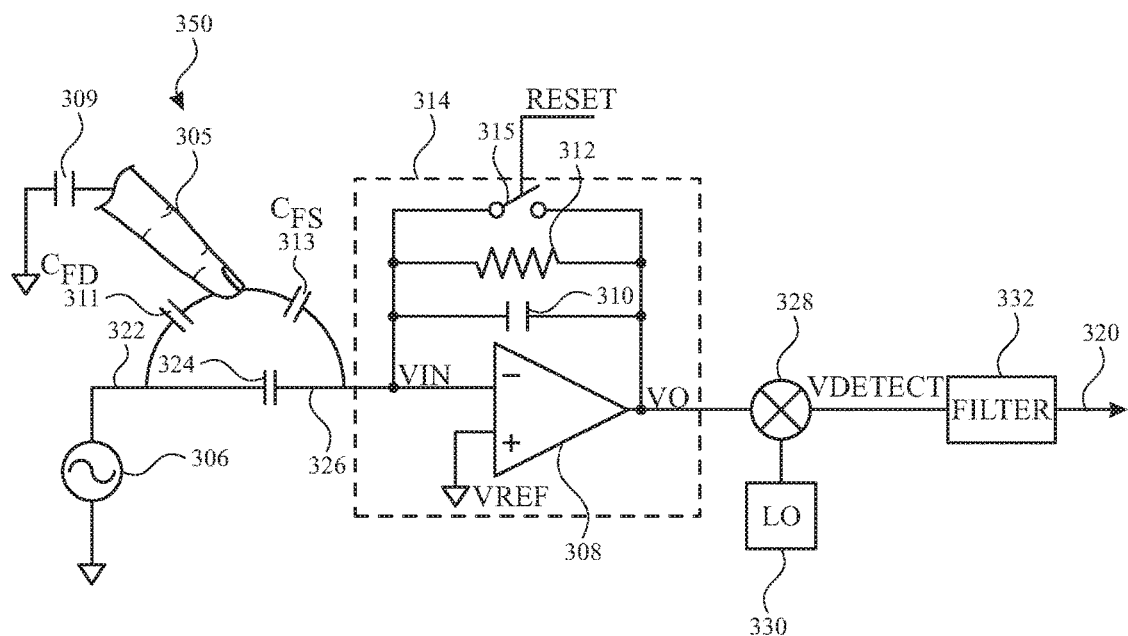
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as $V_{in}$) can be inputted into the inverting input of operational amplifier 308, and the non-inverting input of the operational amplifier can be coupled to a reference voltage $V_{ref}$. Operational amplifier 308 can drive its output to voltage $V_o$ to keep yin substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310, and the impedance of mutual capacitance 324. The output of the amplifier 308 is demodulated at the frequency of stimulus signal $V_{ac}$ (homodyne or synchronous detection) by demodulator 328 and then integrated (or averaged) by filter 332. Note that in some examples, demodulator can be an I/Q demodulator. In some examples, the demodulator (or I/Q demodulator) can be in the digital domain, where the output of amplifier 308 can be digitized first by an ADC before performing demodulation and filtering.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
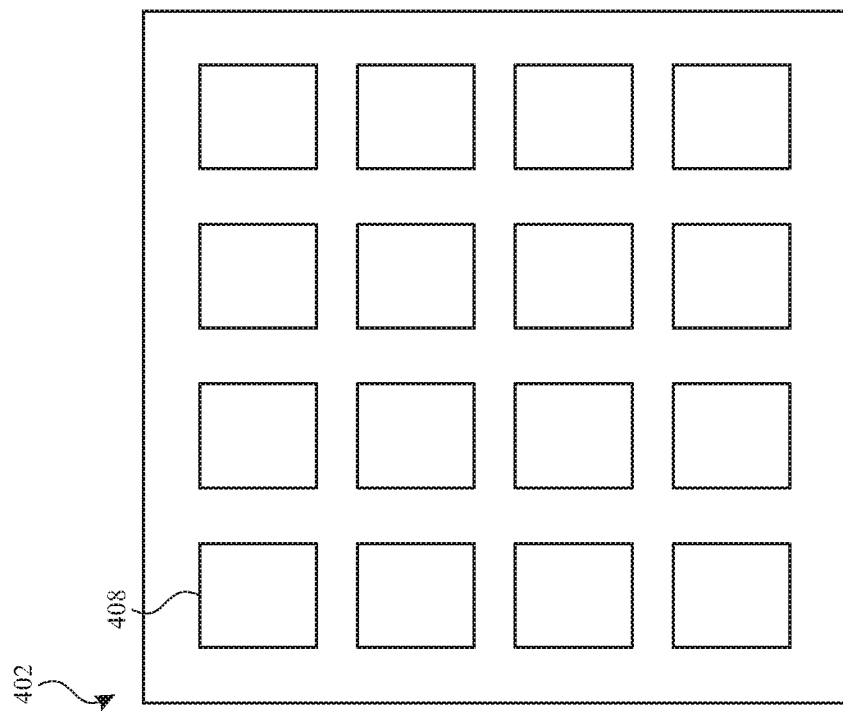
FIG. 4B illustrates touch screen with touch node electrodes arranged in a pixelated touch node electrode configuration according to examples of the disclosure.
Figure 4A:
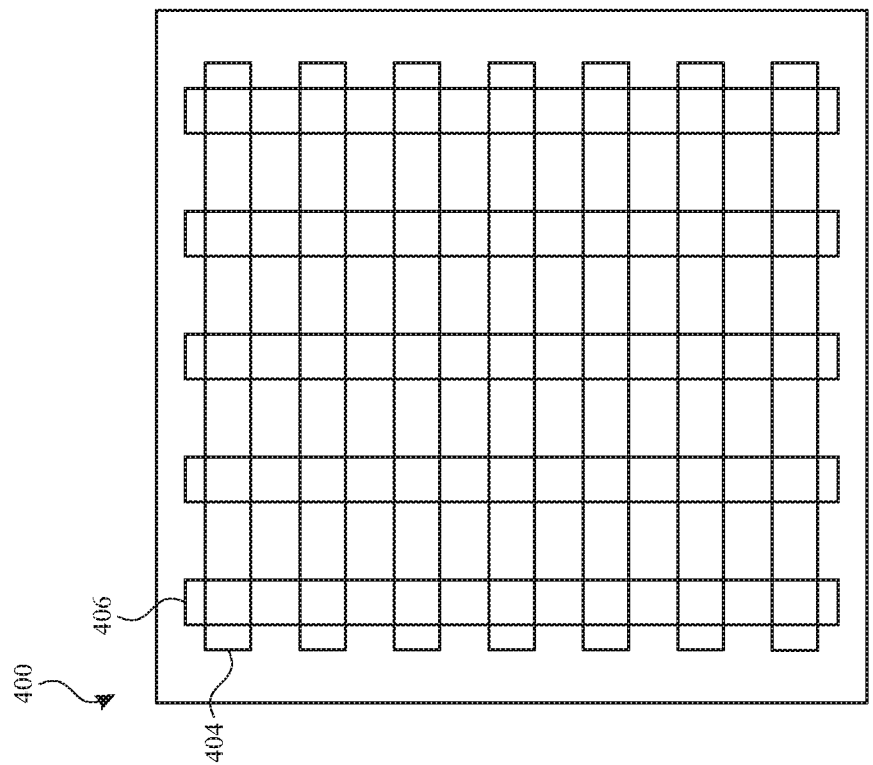
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400. Although the touch electrodes 404 and 406 are illustrated as being rectangle-shaped, it should be understood that other electrode shapes and structures (e.g., diamond-, square-, stripe- or circle-shaped electrodes connected by jumpers or vias) are possible.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402. Although touch node electrodes 408 are illustrated as having rectangular shapes, it should be understood that other electrode shapes (e.g., diamonds, circles, stripes etc.) and structures are possible.

Figure 5A:
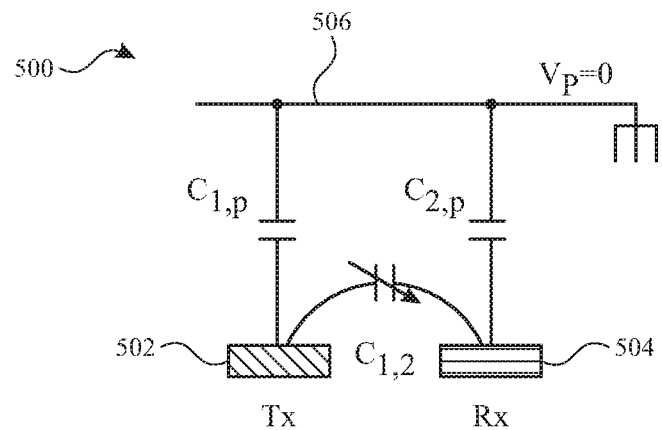
FIGS. 5A-5C illustrate exemplary circuit diagrams modeling mutual capacitance touch sensing in various scenarios according to some examples of the disclosure.
Figure 5B:
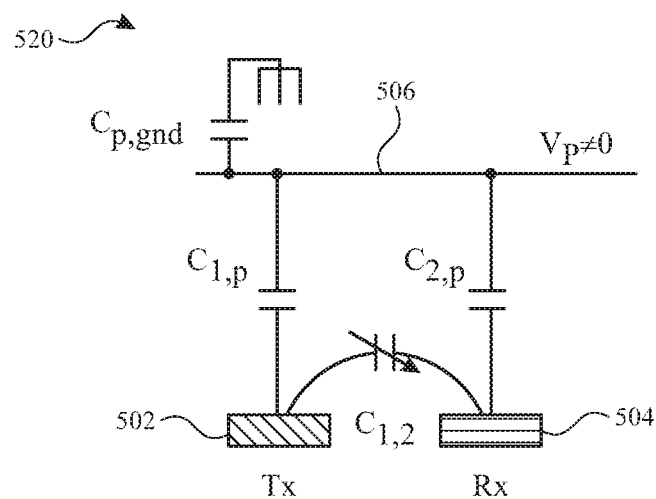
Figure 5C:
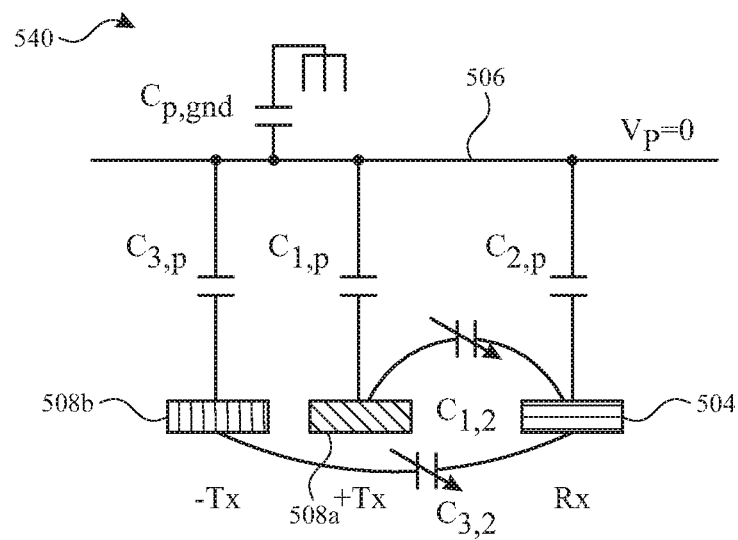

FIGS. 5A-5C illustrate exemplary circuit diagrams modeling mutual capacitance touch sensing in various scenarios according to some examples of the disclosure. The circuits illustrated in FIGS. 5A-5C can be illustrated as having one or more Tx electrodes (e.g., drive electrodes) and one Rx electrode, for example. It should be understood that, in some examples, a touch screen can include a plurality of touch nodes and each of the touch nodes can be represented by one of the circuits illustrated in FIGS. 5A-5C.

For example, the circuit 500 illustrated in FIG. 5A represents mutual capacitance sensing of a proximate object that is well-grounded. In some examples, an object is well-grounded if it provides a path to system ground or some other known reference voltage with less than a threshold impedance such that the object is effectively grounded. Circuit 500 illustrated in FIG. 5A can include Tx electrode 502 (e.g., a drive electrode), Rx electrode 504 (e.g., a sense electrode), a proximate object 506 (e.g., a finger of the user, a stylus, or another conductive object), and the capacitances between each of the elements of the circuit 500. Tx electrode 502 can be similar to drive electrode 322 described above with reference to FIG. 3B and Rx electrode 504 can be similar to sense electrode 326 described above with reference to FIG. 3B. Note that the system ground connections shown in FIG. 3B can be referenced to the same ground as earth ground shown in FIGS. 5A-5C. Moreover, circuit 500 can include additional elements not illustrated in FIG. 5A, such as one or more components illustrated in FIG. 3B.

In some examples, when object 506 is proximate to or touching the touch screen in a scenario modeled by circuit 500, a capacitance $C_{1,P}$ is formed between the object 506 and the Tx electrode 502 and capacitance $C_{2,P}$ is formed between the object 506 and the Rx electrode 504. As described above with reference to FIG. 3B, the capacitive coupling of the object 506 and the electrodes 502 and 504 can cause the mutual capacitance $C_{1,2}$ between the Tx electrode 502 and the Rx electrode 504 to decrease relative to the mutual capacitance $C_{1,2}$ without the proximity of the object 506. This change in mutual capacitance can be sensed as described above, such as with reference to FIG. 3B and the amount of change in the charge into the RX node is $\Delta Q_{1,2} = V_{Tx} \Delta C_{1,2}$.

In some examples, the mutual capacitance $C_{1,2}$ between the Tx electrode 502 and the Rx electrode 504 decreases in the presence of object 506 because the object 506 is well-grounded as described above. As described below with reference to FIGS. 5B-5C, if the object 506 is poorly grounded, the mutual capacitance $C_{1,2}$ may not decrease in response to object 506 to the same extent as $C_{1,2}$ decreases in response to a well-grounded object 506. In some examples, an object is poorly-grounded if it does not provide a path to system ground or some other reference voltage with an impedance below a predetermined threshold, such as an object that provides a path to system ground or the reference voltage with an impedance above the threshold or an object that is not coupled to ground or the reference voltage at all. In some examples, if object 506 is poorly grounded, charge injected through $C_{1,p}$ and $C_{2,p}$ may cause errors in the estimate of the mutual capacitance $C_{1,2}$, which may make it appear as though $C_{1,2}$ decreases more, less, not at all, or even increase when the poorly grounded object 506 is proximate to the touch screen relative to the apparent change in mutual capacitance $C_{1,2}$ when a well-grounded object is proximate to the touch screen. These variations can cause the electronic device to fail to detect the object 506 (e.g., because the change in capacitive coupling is less than a detection threshold), fail to detect other objects proximate to the touch screen, or to undergo a "negative pixel effect" in which charge coupled to the object 506 causes the mutual capacitance $C_{1,2}$ to increase in the presence of the poorly grounded object instead of decreasing, for example.

FIG. 5B illustrates a circuit 520 representing mutual capacitance touch detection of a poorly grounded object 506, for example. Circuit 520 includes the same Tx electrode 502 and Rx electrode 504 described above with reference to FIG. 5A and, like circuit 500 illustrated in FIG. 5A, may include additional elements not illustrated in FIG. 5B, such as one or more of the elements described above with reference to FIG. 3B.

Unlike circuit 500, the object 506 that is proximate to or in contact with the touch screen including the Tx electrode 502 and the Rx electrode 504 can be poorly grounded. As shown in FIG. 5B, the object 506 can be capacitively coupled to ground by some capacitance $C_{p,gnd}$ (a capacitive coupling path with greater than the threshold impedance). In essence, $C_{1,P}$ forms a voltage divider with $C_{2,P}$ and unknown capacitor $C_{P,GND}$ applied to $V_{Tx}$ causing a voltage $V_P$ to appear at node $V_P$. Therefore, the effective charge coupled to the RX node is $\Delta Q_{1,2} = V_{Tx} \Delta C_{1,2} + V_P C_{2,P}$. Thus, in some examples, the voltage $V_P$ (which is responsible for the negative pixel term) of the object 506 can be a different potential than the ground potential.

When sensing touch signals to determine mutual capacitance $C_{1,2}$ between the Tx electrode 502 and the Rx electrode 504 in FIG. 5B, the poor grounding of object 506 can interfere with the accuracy of the determination of $C_{1,2}$ from the measured sense signal. In some examples, these errors can cause the sensed touch signals to appear as though there is no object 506 proximate to the touch screen, can cause "negative pixels" to be detected in the touch data or can cause other touch sensing errors. In some examples, it can be advantageous to mitigate poor grounding to reduce the "negative pixel" effect and other touch sensing errors.

FIG. 5C illustrates another circuit 540 that can represent mutual capacitance sensing of a poorly grounded object 506 using multiple drive signals. Like circuits 500 and 520, circuit 540 can include Rx electrode 504 that can be used to sense a proximate object 506 that is close to or touching the touch screen that includes Rx electrode 504, for example. In some examples, circuit 540 includes two drive electrodes, −Tx 508b and +Tx 508a, which can be included in the touch screen that includes Rx electrode 504. In some examples, the touch screen that includes electrodes 504, 508a, and 508b can further include one or more components described above with reference to FIG. 3B.

In some examples, the +Tx electrode 508a and the −Tx electrode 508b can be driven with balanced drive signals having opposite drive waveforms. For example, the drive signals can have the same magnitude and frequency and can be out of phase from each other by 180°. In some examples, these signals can be capacitively coupled to the proximate object 506 via capacitances $C_{3,p}$ and $C_{1,p}$. The capacitances $C_{3,p}$ and $C_{1,p}$ can be the same or substantially the same, for example. Thus, in some examples, the proximate object 506 can experience a net voltage of zero from the balanced drive signals (e.g., Vp=0), thereby mitigating the poor grounding of the object 506. For example, if charge is being coupled to the surface of the touch screen by way of object 506, the charge can have a path to system ground through $C_{3,p}$ and/or $C_{1,p}$. The effective charge coupled into the RX node is $\Delta Q_{1,2} = V_{Tx+} \Delta C_{1,2} + V_{Tx-} \Delta C_{1,3} = V_{Tx}(\Delta C_{1,2} - \Delta C_{1,3})$.

As shown in FIG. 5C, in some examples, each drive electrode (e.g., +Tx electrode 508a and −Tx electrode 508b) can capacitively couple to the Rx electrode 504. For example, mutual capacitance $C_{1,2}$ can form between the +Tx electrode 508a and the Rx electrode 504, and mutual capacitance $C_{1,3}$ can form between the −Tx electrode 508b and the Rx electrode 504. In some examples, the drive voltages applied to each drive electrode 508a and 508b can capacitively couple to the Rx electrode 504. In some examples, as shown in FIG. 5C, the −Tx electrode 508b and the +Tx electrode 508a can each be located a different distance from the Rx electrode 504, such that $C_{1,2}$ and $C_{1,3}$ may not be the same. For example, as shown in FIG. 5C, because the distance between +Tx electrode 508a and Rx electrode 504 is less than the distance between the −Tx electrode 508b and the Rx electrode 504, $C_{1,2}$ can be greater than $C_{1,3}$. As a result, the net drive voltage signal coupled to the Rx electrode 504 can be non-zero and can have the same phase as the drive signal applied to the +Tx electrode 508a, for example. It should be understood that, in some examples, the distance between the −Tx electrode 508b and the Rx electrode 504 can instead be less than the distance between +Tx electrode 508a and Rx electrode 504. In some examples, positioning the +Tx electrode 508a and the −Tx electrode 508b at different distances from the Rx electrode 504 can cause the signal detected at the Rx electrode 504 to be non-zero, thereby enabling detection of a proximate object 506 (e.g., an object proximate to or touching the touch screen including electrodes 504 and 508a-b) without a resulting net zero mutual capacitance even though the net voltage coupled to the object 506 from the Tx electrodes 508a-b can be zero.

In some examples, circuit 540 can correspond to various electrode layouts in which the +Tx electrodes 508a and the −Tx electrodes 508b have the same area and different distances from the Rx electrodes 504. Accordingly, various electrode layouts can be implemented according to the touch sensing needs of a respective electronic device that uses balanced mutual capacitance touch sensing according to the disclosure. For example, tradeoffs between accuracy, time/power efficiency, touch screen thickness, and complexity and/or number of routing traces can be made according to the typical use cases and cost considerations of the electronic device to select the appropriate electrode layout. Various example electrode layouts corresponding to circuit 540 are described in more detail below with reference to FIGS. 6A-6C and 7.

Figure 6A:
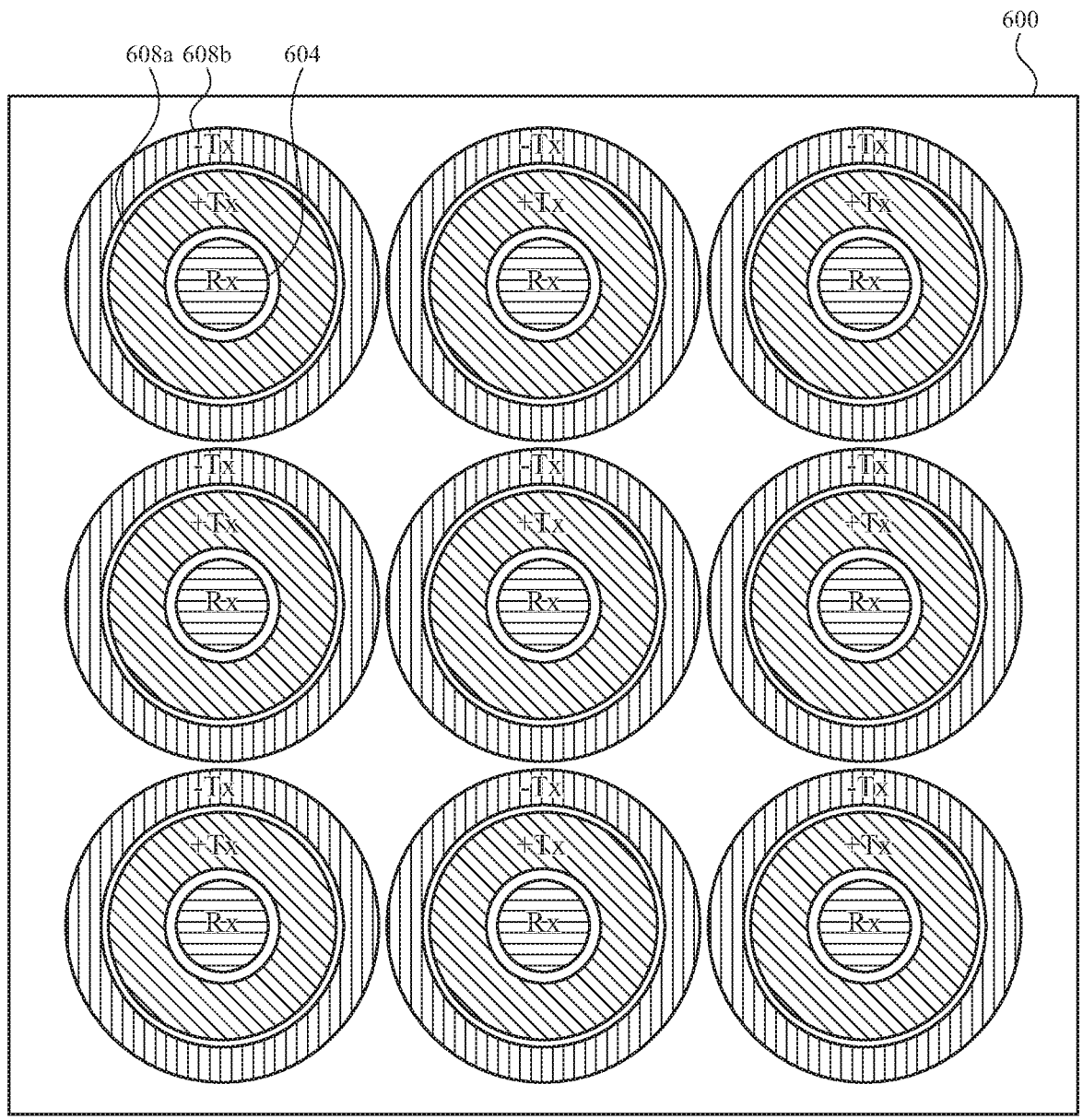
FIGS. 6A-6C illustrate exemplary electrode layouts of touch screens according to examples of the disclosure.
Figure 6B:
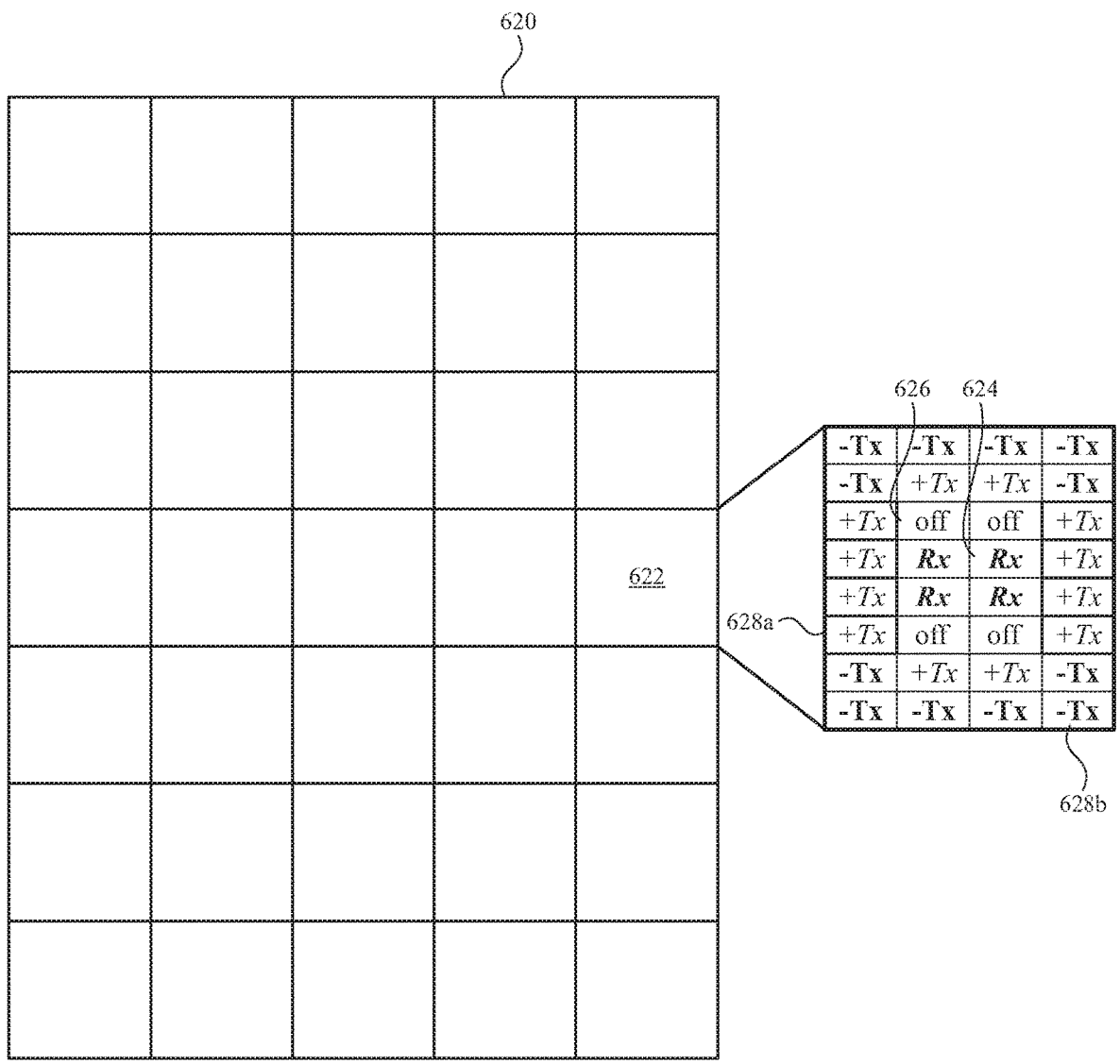
Figure 6C:
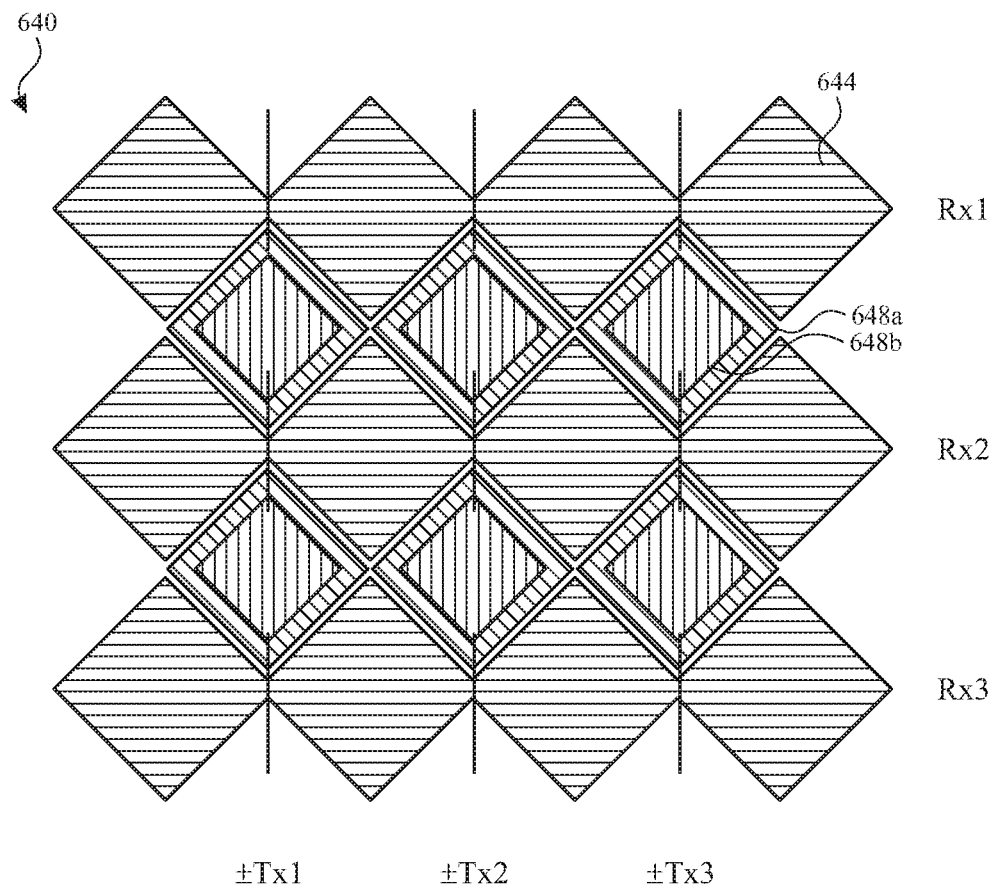

FIGS. 6A-6C illustrate exemplary electrode layouts of touch screens according to examples of the disclosure. In some examples, the touch screens can include a plurality of sense electrodes, a plurality of drive electrodes driven with voltage signals having a first phase, and a plurality of drive electrodes driven with voltage signals having a second phase. Each touch node of the touch screens illustrated in FIGS. 6A-6C can include a sense electrode, a drive electrode that can be driven with a voltage signal having a first phase, and a drive electrode that can be driven with a voltage signal having a second phase, for example. In some examples, each of these touch nodes can be modeled by circuit 540 described above with reference to FIG. 5C.

As an example, the touch screen 600 in FIG. 6A can include a plurality of Rx electrodes 604 (e.g., sense electrodes), a plurality of +Tx electrodes 608a (e.g., drive electrodes that can be driven with a voltage signal having a first phase), and a plurality of −Tx electrodes 608b (e.g., drive electrodes that can be driven with a voltage signal having a second phase opposite the first phase). In some examples, the Rx electrodes 604 illustrated in FIG. 6A can be modeled by Rx electrode 504 illustrated in FIG. 5C, the +Tx electrodes 608a illustrated in FIG. 6A can be modeled by +Tx electrode 508a illustrated in FIG. 5C, and the −Tx electrodes 608b illustrated in FIG. 6A can be modeled by the −Tx electrode 508b illustrated in FIG. 5C. For example, the +Tx electrodes 608a can be driven with drive voltage signals that are out of phase with the drive voltage signals applied to the −Tx electrodes 608b by 180° (e.g., driving +Tx electrodes 608a and −Tx electrodes 608b with balanced drive signals).

In some examples, as shown in FIG. 6A, the Rx electrodes 604, +Tx electrodes 608a, and −Tx electrodes 608b can be arranged concentrically. For example, the +Tx electrode 608a can be disk-shaped including a hole in which the circle-shaped Rx electrode 604 can be located, and the −Tx electrode 608b can be disk-shaped including a hole in which the +Tx electrode 608a and the Rx electrode 604 can be located. Although the electrodes 604 and 608a-b can be circular in shape as shown in FIG. 6A, in some examples, other shapes can be used, such as squares, rectangles, diamonds, triangles, hexagons. In some examples, a single Rx electrode 604, a single +Tx electrode 608a, and a single −Tx electrode 608b can be associated with a respective touch node of the touch screen 600. For example, as shown in FIG. 6A, touch screen 600 can include a touch node at the location of each group of electrodes including a respective Rx electrode 604, a respective +Tx electrode 608a, and a respective −Tx electrode 608b. In some examples, a plurality Rx electrodes 604, +Tx electrodes 608a, and −Tx electrodes 608b can be included in each touch node, as described in more detail below with reference to FIG. 6B.

Still referring to FIG. 6A, in some examples, the area of the +Tx electrodes 608a can be equal to (or within a threshold of equal to) the area of the −Tx electrodes 608b so that the capacitive coupling of a proximate object to each of the +Tx electrodes 608a and −Tx electrodes 608b can be equal (or within a threshold of equal). In some examples, making the capacitive coupling to proximate objects of each of the +Tx electrodes 608a and the −Tx electrodes 608b equal or substantially equal can cause the net voltage experienced by the proximate object to be zero when the amplitudes and frequencies of the drive signals applied to the +Tx electrodes 608a and the −Tx electrodes 608b are the same and the phases are opposite (e.g., out of phase by 180°). In some examples, the area of the Rx electrodes 604 can be the same as or different from the areas of the +Tx electrodes 608a and the −Tx electrodes 608b.

As described above with reference to FIG. 5C and as shown in FIG. 6A, in some examples, for each touch node included in touch screen 600, the distance between the respective +Tx electrode 608a and the Rx electrode 604 can be less than the distance between the respective −Tx electrode 608b and the Rx electrode 604. In some examples, this arrangement causes the capacitive coupling between the +Tx electrodes 608a and the Rx electrodes 604 to be greater than the capacitive coupling between the −Tx electrodes 608b and the Rx electrodes 604. Thus, for example, the net signal sensed by the Rx electrodes 604 can have a non-zero magnitude and can have the same phase as the drive signal applied to the +Tx electrode 608a.

As another example, the touch screen 620 in FIG. 6B can include a plurality of touch nodes 622. In some examples, each touch node 622 can include an array of electrodes. FIG. 6B illustrates an expanded view of one such touch node 622 including Rx electrodes 624, +Tx electrodes 628a, −Tx electrodes 628b, and additional electrodes 626 (e.g., electrodes at a fixed potential or ground during a balanced mutual capacitance touch scan). In some examples, electrodes 624, 626, and 628a-b can be multi-functioning electrodes that can be used as touch electrodes during a touch phase of touch screen operation and can be used as part of display circuitry (e.g., as common electrodes, anodes, or cathodes driven with a ground or reference voltage, a negative voltage, a positive voltage, a data voltage, or other voltage) during a display phase of touch screen operation. For example, the operation of the electrodes 624, 626, and 628a-b can be time multiplexed between display operation and touch detection. In some examples, voltages applied to electrodes 624, 626, and 628a-b during the display phase can be different from the voltages applied to the +Tx electrodes 628a and the −Tx electrodes 628b during the touch detection phase. Exemplary operation of the Rx electrodes 624, +Tx electrodes 628a, and −Tx electrodes 628b during the touch detection phase will now be described.

In some examples, the Rx electrodes 624 illustrated in FIG. 6B can be modeled by Rx electrode 504 illustrated in FIG. 5C, the +Tx electrodes 628a illustrated in FIG. 6B can be modeled by +Tx electrode 508a illustrated in FIG. 5C, and the −Tx electrodes 628b illustrated in FIG. 6B can be modeled by the −Tx electrode 508b illustrated in FIG. 5C. For example, the +Tx electrodes 628a can be driven with drive voltage signals that are out of phase with the drive voltage signals applied to the −Tx electrodes 628b by 180°.

In some examples, as shown in FIG. 6B, the Rx electrodes 624, +Tx electrodes 628a, and −Tx electrodes 628b can be arranged such that the distance between the +Tx electrodes 628a and the Rx electrodes 624 can be less than the distance between the −Tx electrodes 628b and the Rx electrodes 624. Thus, in some examples, the capacitive coupling of the +Tx electrodes 628a to the Rx electrodes 624 can be greater than the capacitive coupling of the −Tx electrodes 628b to the Rx electrodes 624, and the signal sensed at the Rx electrodes 624 can be non-zero.

In some examples, each touch node 622 can include a plurality of Rx electrodes 624, a plurality of +Tx electrodes 624a, and a plurality of −Tx electrodes 624b. Electrodes of the same type of electrode within a respective touch node 622 may either be electrically isolated or may be coupled together while the touch screen 620 operates in the touch detection mode, for example. For example, all of the +Tx electrodes 628a within a respective touch node 622 can be independently driven with a first drive signal simultaneously, all of the −Tx electrodes 628b within the respective touch node 622 can be independently driven with a second drive signal simultaneously, and each Rx electrode 624 in the respective touch node 622 can be independently sensed. In some examples, the sensed signals for each Rx electrode 624 can be combined or compared, such as by calculating a mean, median, or mode of the touch signals to detect touch. As another example, all of the +Tx electrodes 628a in a respective touch node 622 can be coupled together and driven with a first drive signal, all of the −Tx electrodes 628b in the respective touch node 622 can be coupled together and driven with a second drive signal, and/or all of the Rx electrodes 624 in the respective touch node 622 can be coupled together and sensed during the touch detection mode. In some examples, some electrodes in a respective touch node 622 are coupled together and others remain electrically isolated. For example, all of the Rx electrodes 624 in a respective touch node 622 can be coupled together during the touch detection mode, whereas the +Tx electrodes 628a and the −Tx electrodes 628b in the respective touch node 622 can be independently driven with the first and second drive signals, respectively. As another example, during the touch detection mode, all of the +Tx electrodes 628a of a respective touch node 622 can be coupled together and driven with a first drive signal, all of the −Tx electrodes 628b of the respective touch node 622 can be coupled together and driven with a second drive signal, and the Rx electrodes 624 in the respective touch node 622 can be independently sensed as previously described.

Still referring to FIG. 6B, in some examples, the total area of the +Tx electrodes 628a included in a respective touch node 622 can be equal to (or within a threshold of being equal to) the total area of the −Tx electrodes 628b in the respective touch node 622 so that the capacitive coupling of a proximate object to each of the +Tx electrodes 628a and −Tx electrodes 628b can be equal. In some examples, making the capacitive coupling to proximate objects of each of the +Tx electrodes 628a and the −Tx electrodes 628b equal (or nearly equal) can cause the net voltage applied to the proximate object to be zero (or near zero) when the amplitudes and frequencies of the drive signals applied to the +Tx electrodes 628a in a respective touch node 622 and the −Tx electrodes 628b in the respective touch node 622 are the same and the phases are opposite (e.g., out of phase by 180°). In some examples, the total area of the Rx electrodes 624 can be the same as or different from the total areas of the +Tx electrodes 628a and the −Tx electrodes 628b.

In some examples, the touch screen 620 can include additional electrodes 626. The additional electrodes 626 can be "off" (neither driven with an AC stimulation voltage nor sensed) during the touch detection mode of the touch screen 620, in some examples. In some examples, the additional electrodes 626 can be coupled to a common voltage (e.g., ground or virtual ground) or may be floating during the touch detection mode of the touch screen 620. In some examples, one or more of the additional electrodes 626 can be used as Rx electrodes 626 during the touch detection mode of the touch screen 620. In some examples, during the display mode, all of the electrodes, including the additional electrodes 626, Rx electrodes 624, +Tx electrodes 628a, and −Tx electrodes 628b can be used to display an image on touch screen 620 (e.g., acting as a Vcom layer).

In some examples with intersecting drive electrodes and sense electrodes (e.g., in a row/column arrangement) similar to the touch screen 400 illustrated in FIG. 4A, the touch electrodes can each be included in multiple touch nodes and each touch node can include an Rx electrode, a +Tx electrode, and a −Tx electrode, as will now be described with reference to FIG. 6C. As shown in FIG. 6C, in some examples, a touch screen 640 can include Rx electrodes 644 arranged in rows and +Tx electrodes 648a and −Tx electrodes 648b arranged in columns. It should be understood that, in some examples, the Rx electrodes 644 can be arranged in rows and the Tx electrodes 628a and 628b can be arranged in columns. The touch nodes of touch screen 640 can be defined as intersections of a row of Rx electrodes 644 with a column of +Tx electrodes 648a and −Tx electrodes 648b. As shown in FIG. 6C, the segments of the touch electrodes can be diamond shape but it should be understood that, in some examples, other shapes are possible, such as squares, circles, triangles, hexagons, pentagons, etc.

In some examples, the Rx electrodes 644 illustrated in FIG. 6C can be modeled by Rx electrode 504 illustrated in FIG. 5C, the +Tx electrodes 648a illustrated in FIG. 6C can be modeled by +Tx electrode 508a illustrated in FIG. 5C, and the −Tx electrodes 648b illustrated in FIG. 6C can be modeled by the −Tx electrode 508b illustrated in FIG. 5C. For example, the +Tx electrode 648a corresponding to a respective column can be driven with drive voltage signals that are out of phase with the drive voltage signals applied to the −Tx electrode 648b corresponding to the same respective column by 180°. In some examples, the +Tx electrode 648a in a respective column can include diamond-shaped segments (including diamond-shaped holes in which segments of the −Tx electrodes 648b can be disposed) connected together by jumpers, traces, vias, or other suitable conductive connectors and the −Tx electrodes 648b in a respective column can include diamond-shaped segments connected together by jumpers traces, vias, or other suitable conductive connectors. The +Tx electrodes 648a are not electrically coupled to the −Tx electrodes 648b.

In some examples, as shown in FIG. 6C, the Rx electrodes 644, +Tx electrodes 648a, and −Tx electrodes 648b can be arranged such that the distance between the +Tx electrodes 648a and the Rx electrodes 624 is less than the distance between the −Tx electrodes 648b and the Rx electrodes 624. For example, each column of Tx electrodes can include diamond-shaped segments of −Tx electrodes 648b that are surrounded by diamond-shaped segments of +Tx electrodes 648a that include diamond-shaped holes in which the segments of the −Tx electrodes 648b may be disposed. Thus, in some examples, the capacitive coupling of the +Tx electrodes 648a to the Rx electrodes 644 can be greater than the capacitive coupling of the −Tx electrodes 648b to the Rx electrodes 644 and the signal sensed at the Rx electrodes 644 can be non-zero.

In some examples, the area of the +Tx electrodes 648a can be equal or within a predetermined threshold of equal to the area of the −Tx electrodes 648b so that the capacitive coupling of a proximate object to each of the +Tx electrodes 648a and −Tx electrodes 648b can be equal. In some examples, making the capacitive coupling to proximate objects of each of the +Tx electrodes 648a and the −Tx electrodes 648b equal can cause the net voltage experienced by the proximate object to be zero when the amplitudes and frequencies of the drive signals applied to the +Tx electrodes 648a in a respective column and the −Tx electrodes 648b in the respective column are the same and the phases are opposite (e.g., out of phase by 180°). In some examples, the area of the Rx electrodes 644 can be the same as or different from the areas of the +Tx electrodes 648a and the −Tx electrodes 648b.

As described in more detail below with reference to FIG. 8B, in some examples, touch screens 600, 620, and 640 can perform multiple types of touch detection scans, including a mutual capacitance scan and a self-capacitance scan. In some examples, during the mutual capacitance scan, the +Tx electrodes can be driven with a first drive signal, the −Tx electrodes can be driven with a second drive signal, and the Rx electrodes can be sensed as described above, such as with reference to FIG. 3B. In some examples, the first drive signal and second drive signal applied to a respective touch node have the same frequency and amplitude and opposite phases. In some examples, the drive signals applied to different touch nodes can have different phases and/or frequencies and/or can be applied at different times.

In some examples, during the self-capacitance scan, the self-capacitance of one or more touch electrodes can be sensed in a manner similar to the manner described above with reference to FIG. 3A. In some examples, the designations between the Rx electrodes, +Tx electrodes, and −Tx electrodes may not apply during self-capacitance scanning and, instead, different groups of electrodes can be designated for differences in functionality or all of the touch electrodes can be used in the same or in similar ways during self-capacitance sensing. For example, the self-capacitance of one or more of the Rx electrodes, +Tx electrodes, and −Tx electrodes can be sensed during the self-capacitance scan. In some examples, one or more touch electrodes can be coupled together during the self-capacitance scan. For example, all of the touch electrodes within a respective touch node can be coupled together during the self-capacitance scan. As another example, referring to FIG. 6B, all of the electrodes of the same type (e.g., Rx electrodes 624, +Tx electrodes 628a, or −Tx electrodes 628b) within a respective touch node 622 can be coupled together during the self-capacitance scan or different groups of touch electrodes can be coupled together for self-capacitance sensing. In some examples, the self-capacitance of each electrode can be sensed separately. In some examples, during the self-capacitance scan all of the electrodes of the touch sensor panel can be stimulated (and some or all of the electrodes can be sensed to measure self-capacitance), such that floating objects, such as water or other liquid, does not provide a conductive path between electrodes (due to all the electrodes being at the same potential due to the shared stimulation signal) and, therefore, the floating object may not be detected.

As described above, in some examples, the balanced mutual capacitance touch scan described with reference to FIGS. 5C-6C can detect well-grounded objects and poorly grounded objects that are proximate to or touching a touch screen, touch sensor panel, or touch sensor. In some situations, it can be advantageous to differentiate between well-grounded objects and floating objects. For example, water or other liquids present on the surface of a touch screen, touch sensor panel, or touch sensor can be floating and can be indistinguishable from other objects, such as a user's hands, a stylus, or other conductive object when sensing touch with the balanced mutual capacitance scan (which may also be poorly grounded). However, detecting water or liquids as indistinguishable from touches can result in undesired behavior in a wet environment. In some examples, a self-capacitance scan may be used to differentiate between water/liquids and other poorly grounded objects, because a self-capacitance scan may not detect floating water/liquids (and some poorly grounded) objects. Thus, in some examples, the touch data collected using the balanced mutual capacitance touch scan and the touch data collected using the self-capacitance scan can be compared to identify water or other liquids that may appear in balanced mutual capacitance touch data but may not appear in the self-capacitance touch data. In some examples, touches in the balanced mutual capacitance touch data due to water or liquids can be ignored, optionally based on one or more additional criteria (e.g., size, location, touch thresholds, etc.). In some examples, ignoring touches made by water or liquids can prevent the electronic device from performing one or more unintended actions that would otherwise result from detecting water or liquid on the surface of the touch screen as a touch by an object such as a finger.

Figure 7:
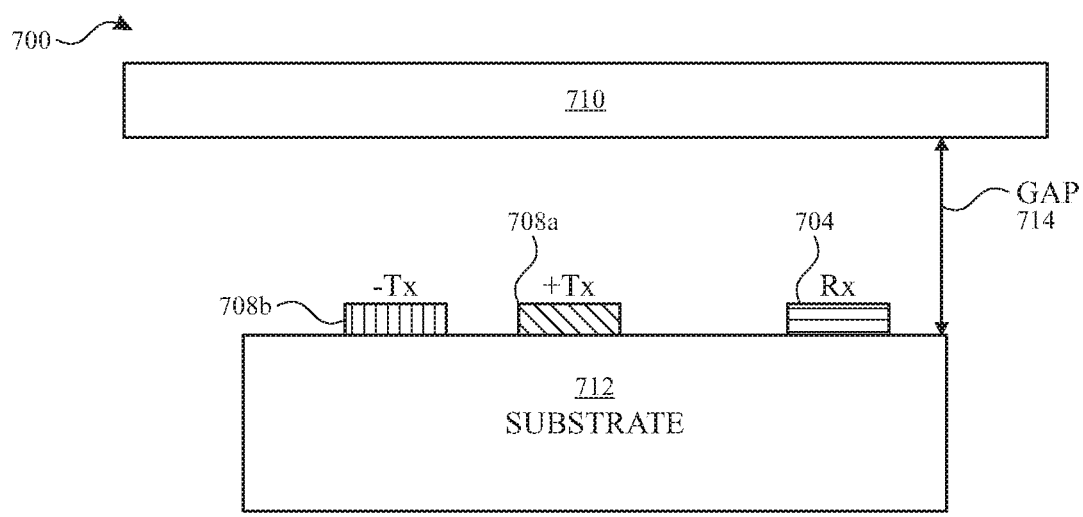
FIG. 7 illustrates a side view of an exemplary touch sensor according to some examples of the disclosure.

FIG. 7 illustrates a side view of an exemplary touch sensor 700 according to some examples of the disclosure. In some examples, the touch sensor 700 can be a touch screen, touch sensor panel, or touch sensor incorporated into one of the devices described above with respect to FIGS. 1A-1H. In some examples, a touch screen or touch sensor panel can include multiple touch nodes similar to the touch node of touch sensor 700 illustrated in FIG. 7. In some examples, a touch sensor can include one touch node similar to the touch node of touch sensor 700 illustrated in FIG. 7.

As an example, the touch sensor 700 in FIG. 7 can include an Rx electrode 704 (e.g., sense electrode), a +Tx electrode 708a (e.g., drive electrode driven with a first phase), and a −Tx electrode 708b (e.g., drive electrode driven with a second phase opposite the first phase). In some examples, the Rx electrode 704 illustrated in FIG. 7 can be modeled by Rx electrode 504 illustrated in FIG. 5C, the +Tx electrode 708a illustrated in FIG. 7 can be modeled by +Tx electrode 508a illustrated in FIG. 5C, and the −Tx electrode 708b illustrated in FIG. 7 can be modeled by the −Tx electrode 508b illustrated in FIG. 5C. For example, the +Tx electrode 708a can be driven with a drive voltage signal that is out of phase with the drive voltage signal applied to the −Tx electrode 708b by 180°.

As previously mentioned, FIG. 7 can illustrate an exemplary side view of a touch sensor 700. In some examples, electrodes 704 and 708a-b can be arranged in a variety of possible top-view orientations corresponding to the side view illustrated in FIG. 7. For example, a number of electrode sizes, shapes, or arrangements can be used. As shown in FIG. 7, in some examples, the +Tx electrode 708a is located between the Rx electrode 704 and the −Tx electrode 708b. Thus, for example, the distance between the +Tx electrode 708a and the Rx electrode 704 can be less than the distance between the −Tx electrode 708b and the Rx electrode 704. In some examples, this arrangement causes the capacitive coupling between the +Tx electrode 708a and the Rx electrode 704 to be greater than the capacitive coupling between the −Tx electrode 708b and the Rx electrode 704. Thus, for example, the net signal sensed by the Rx electrode 704 can have a non-zero magnitude and can have the same phase as the drive signal applied to the +Tx electrode 708a.

In some examples, the area of the +Tx electrode 708a (e.g., in a top view, not shown) can be equal or within a threshold of equal to the area of the −Tx electrode 708b (e.g., in a top view, not shown) so that the capacitive coupling of a proximate object to each of the +Tx electrode 708a and −Tx electrode 708b can be equal. In some examples, making the capacitive coupling to proximate objects of each of the +Tx electrode 708a and the −Tx electrode 708b equal can cause the net voltage applied to the proximate object to be zero when the amplitudes and frequencies of the drive signals experienced by the +Tx electrode 708a and the −Tx electrode 708b are the same and the phases are opposite (e.g., out of phase by 180°). In some examples, applying a net voltage of zero to the proximate object can prevent the negative pixel effect and other touch detection errors associated with poor grounding from occurring. In some examples, the area of the Rx electrode 704 (e.g., from a top view, not shown) can be the same as or different from the areas of the +Tx electrode 708a and the −Tx electrode 708b.

In some examples, the Rx electrode 704, +Tx electrode 708a, and −Tx electrode 708b can be disposed on a substrate 712. The touch sensor 700 can further include an outer surface 710 that is separated from the substrate by gap 714, for example. In some examples, when a proximate object touches the outside of outer surface 710, the outer surface 710 is able to deflect, which can reduce the gap 714 between the outer surface 710 and the substrate 712. When the gap 714 reduces, in some examples, the proximate object is able to move closer to the electrodes 704 and 708a-b than would be possible if the outer surface 710 did not deflect. Thus, in some examples, the deflection of the outer surface 710 can increase the capacitive coupling of the proximate object to the electrodes 704 and 708a-b, and by measuring changes in the mutual capacitance, a touch can be detected and/or an amount of force can be inferred from the change in the gap 714. Thus, the increase in capacitive coupling can improve the accuracy of the touch sensor 700 and/or provide force-sensing capability to the touch sensor.

In some examples, substrate 712 can be included in a system-in-package (SIP) including one or more sensors (including or excluding the touch sensor) integrated as a chip. Thus, in some examples, electrodes 704 and 708a-b can be included in the SIP. In some examples, the electrodes 704 and 708a-b can be external to the SIP.

Figure 8A:
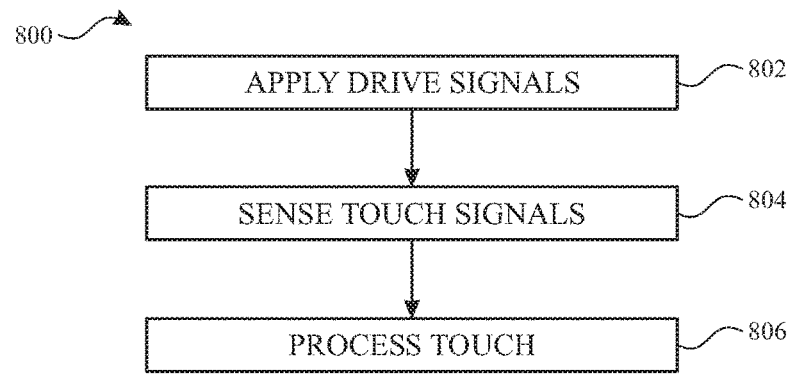
FIGS. 8A-8B are flow charts illustrating exemplary processes including balanced mutual capacitance touch sensing according to some examples of the disclosure.
Figure 8B:
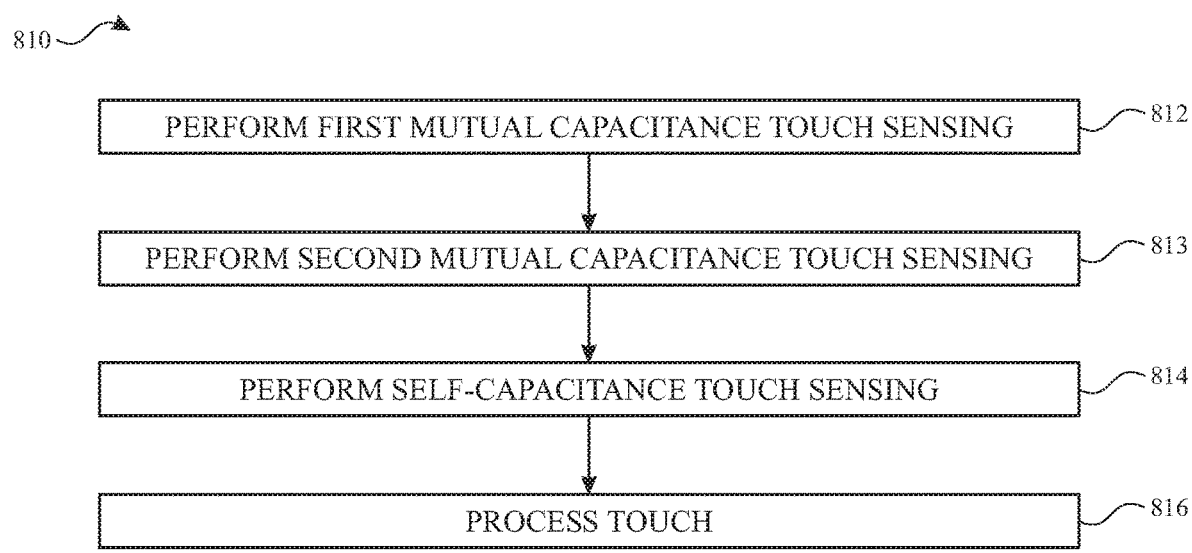

FIGS. 8A-8B are flow charts illustrating exemplary processes 800 and 810 including balanced mutual capacitance touch sensing according to some examples. In some examples, processes 800 and 810 can be performed by one or more touchscreens, touch sensor panels, or touch sensors described above with reference to FIGS. 1A-7.

Referring to FIG. 8A, in some examples, process 800 can be used to perform balanced mutual capacitance touch sensing. Although process 800 is described below as being performed by an electronic device including a touch screen (e.g., 600, 620, and/or 640), it should be understood that, in some examples, a touch sensor (e.g., touch sensor 700) or touch sensor panel can be used to perform process 800.

In some examples, the electronic device applies (802) drive signals to the Tx electrodes of the touch screen. For example, a first drive voltage signal can be applied to one or more +Tx electrodes of the touch screen and a second drive voltage signal can be applied to one or more −Tx electrodes of the touch screen. In some examples, the first and second drive voltage signals can have the same amplitude and frequency. In some examples, the first and second drive voltage signals can have opposite phases (e.g., the first and second drive voltage signals can be out of phase with one another by 180°).

In some examples, the electronic device senses (804) touch signals at the Rx electrodes of the touch screen. In some examples, sensing the touch signals can allow the electronic device to determine the change in mutual capacitance between the Rx electrodes and the −Tx electrodes and between the Rx electrodes and the +Tx electrodes. Although, in some examples, as described above, the drive voltage signals applied to the +Tx electrodes and the −Tx electrodes can have a combined voltage of zero or substantially zero, because the +Tx electrodes and the −Tx electrodes are different distances from the Rx electrodes, the net drive signal coupled to the Rx electrodes can be non-zero. Thus, for example, the electronic device is able to sense a change in the signal coupled to the Rx electrodes to detect touch.

In some examples, the electronic device processes (806) the detected touch(es) and, in some examples, detected force at the surface of the touch screen. Detecting touches at the surface of the touch screen optionally includes detecting objects proximate to, but not touching, the surface of the touch screen. For example, one or more objects hovering proximate to the surface of the touch screen can be detected. In some examples, processing touch can include identifying one or more contact areas or hover areas of the touch screen that overlap with locations at which objects are touching and/or hovering. In some examples, processing touch can include tracking the movement of one or more proximate objects, such as to detect swipes or other gestures that include movement of a proximate object. The electronic device is able to perform one or more actions in response to the processed touch, such as navigating one or more user interfaces of the electronic device, making selections, for example, and the like.

As described above, in some examples, an electronic device performs multiple types of touch scans to distinguish well-grounded objects and poorly grounded objects proximate to or touching the surface of a touch screen, touch sensor, or touch sensor panel according to process 810, which will now be described with reference to FIG. 8B.

In some examples, an electronic device can perform 812 a first mutual capacitance touch sensing process (e.g., a balanced mutual capacitance touch sensing process) using the touch screen. The balanced mutual capacitance touch sensing process can include one or more steps of process 800 described above with reference to FIG. 8A, for example. In some examples, the balanced mutual capacitance touch sensing process can include applying first drive voltage signals to one or more +Tx electrodes of the touch screen and applying second drive voltage signals to one or more −Tx electrodes of the touch screen. For example, the first drive voltage signal and the second drive voltage signal can have the same amplitude and frequency and can have opposite phases (e.g., the first and second drive voltage signals can be out of phase with one another by 180°). The balanced mutual capacitance touch sensing process can further include sensing the capacitively coupled signal at the Rx electrodes to determine the change in mutual capacitance between the Rx electrodes and the +Tx and −Tx electrodes to detect proximate objects. In some examples, the balanced mutual capacitance touch sensing process can be used to detect well-grounded and poorly grounded objects proximate to the touch screen.

In some examples, the electronic device can perform 813 a second mutual capacitance touch sensing process using the touch screen. In some examples, during the second mutual capacitance touch sensing process, the drive signals applied to the +Tx electrodes and −Tx may not have a net voltage of zero. For example, within a respective touch node, the same drive signal can be applied to both the +Tx electrode(s) and −Tx electrode(s) of the respective touch node.

In some examples, the electronic device can perform 812 the first mutual capacitance touch sensing and perform 813 the second mutual capacitance touch sensing at different times. In some examples, the electronic device can perform 812 the first mutual capacitance touch sensing and perform 813 the second mutual capacitance touch sensing concurrently. For example, the electronic device can drive the +Tx electrode(s) of a respective touch node with a drive signal that includes a first frequency with a first phase and a second frequency with a third phase and drive the −Tx electrode(s) of the respective touch node with a drive signal that includes the first frequency with a second phase, opposite the first phase, and the second frequency with the third phase. In this way, in some examples, the components of the touch signals having the first phase can be balanced and have a net voltage of zero while the components of the touch signals having the second phase can have a non-zero net voltage. The first and second frequencies can be different. In some examples, the electronic device can demodulate the received sense signals at both the first and second frequencies to analyze the touch data of both the first mutual capacitance and second mutual capacitance touch sensing processes.

In some examples, the electronic device can perform 814 a self-capacitance touch sensing process using the touch screen. The self-capacitance touch sensing process can be similar to the description of self-capacitance above with reference to FIG. 3A, for example. In some examples, one or more of the Rx, +Tx, and/or −Tx electrodes can be used to detect touch using self-capacitance. In some examples, the electronic device can detect well-grounded objects proximate to the touch screen using self-capacitance. In some examples, floating water or liquids may not change the self-capacitance enough to be detected during the self-capacitance touch sensing process.

In some examples, the electronic device can process (816) the touch data, which can include processing touch data collected during the balanced mutual capacitance touch sensing process and touch data collected during the self-capacitance touch sensing process. In some examples, processing (816) the touch data in process 810 can include one or more of the details of the ways the electronic device processes (806) the touch data according to process 800 described above with reference to FIG. 8A. In some examples, processing (816) touch in process 810 can include comparing the touch data collected from the balanced mutual capacitance touch sensing process 812 and the self-capacitance touch sensing process 814. Comparing the touch data can enable the electronic device to differentiate floating water or liquids and from poorly grounded or well-grounded proximate objects (e.g., fingers, etc.). In some examples, the electronic device can ignore touches from floating water or liquids based on one or more criteria, such as size, shape, location, duration, etc. of the detected touch. In some examples, the criteria can be selected to avoid processing indications of touch caused by water on the surface of the touch screen that are not based on an intentional user input. Examples of indications of touch based on intentional user input can include users touching the touch screen with their hands or fingers, and/or with a stylus or other input device and intentional user input can be detected based on the proximity of other objects not expressly recited here.

Some examples of the disclosure relate to an electronic device, comprising: a touch sensor panel including a plurality of first drive electrodes, a plurality of second drive electrodes, and a plurality of sense electrodes, wherein each touch node of a plurality of touch nodes included in the touch sensor panel includes a first drive electrode, a second drive electrode, and a sense electrode; and drive circuitry configured to, for each touch node: apply a first drive signal to the first drive electrode; and apply a second drive signal to the second drive electrode, wherein a phase of the first drive signal is opposite from a phase of the second drive signal; and sense circuitry configured to, for each touch node: sense a voltage of the sense electrode, the voltage indicative of mutual capacitances between the sense electrode and the first drive electrode and between the sense electrode and the second drive electrode.

Some examples of the disclosure are directed to a touch sensor including a first drive electrode, a second drive electrode, and a sense electrode; and drive circuitry configured to: apply a first drive signal to the first drive electrode; and apply a second drive signal to the second drive electrode, wherein a phase of the first drive signal is different from a phase of the second drive signal; and sense circuitry configured to: sense a voltage of the sense electrode, the voltage indicative of mutual capacitances between the sense electrode and the first drive electrode and between the sense electrode and the second drive electrode. Additionally or alternatively, in some examples, a distance between the first drive electrode and the sense electrode is different from a distance between the second drive electrode and the sense electrode. Additionally or alternatively, in some examples, an area of the first drive electrode is the same as an area of the second drive electrode. Additionally or alternatively, in some examples, an amplitude of the first drive signal is the same as an amplitude of the second drive signal, and a frequency of the first drive signal is the same as a frequency of the second drive signal. Additionally or alternatively, in some examples, a sum of the first drive signal and the second drive signal is substantially zero volts. Additionally or alternatively, in some examples, a mutual capacitance of the first drive electrode and the sense electrode is different from a mutual capacitance of the second drive electrode and the sense electrode. Additionally or alternatively, in some examples, the touch sensor is one of a plurality of touch nodes included in a touch sensor panel of the electronic device, each touch node included in the touch sensor panel includes a respective sense electrode, a respective first drive electrode, and a respective second drive electrode, the respective sense electrode is surrounded by the respective first drive electrode, and the respective first drive electrode and respective sense electrode are surrounded by the respective second drive electrode. Additionally or alternatively, in some examples, the touch sensor is included in a touch sensor panel of the electronic device, the touch sensor panel including a plurality of first drive electrodes, a plurality of second drive electrodes, and a plurality of sense electrodes; each sense electrode includes a plurality of connected sense electrode segments disposed along a first dimension of the touch sensor panel, each first drive electrode includes a plurality of connected first drive electrode segments, each second drive electrode includes a plurality of connected second drive electrode segments, the plurality of connected first drive electrode segments and the plurality of second drive electrode segments are disposed along a second dimension of the touch sensor panel that is perpendicular to the first dimension, and each respective first drive electrode segment is surrounded by a respective second drive electrode segment. Additionally or alternatively, in some examples, the touch sensor is one of a plurality of touch nodes included in a touch sensor panel of the electronic device, the touch sensor panel including a plurality of first drive electrodes, a plurality of second drive electrodes, and a plurality of sense electrodes, each touch node of a plurality of touch nodes included in the touch sensor panel includes a first drive electrode, a second drive electrode, and a sense electrode, the drive circuitry is further configured to, at a different time from applying the first drive signal to the first drive electrode and applying the second drive signal to the second drive electrode, for each touch node: apply a third drive signal to one or more of the first drive electrode, the second drive electrode, or the sense electrode, and the sense circuitry is further configured to, at a different time from sensing the voltage indicative of the mutual capacitance, for each touch node: sense one or more second voltages of the first drive electrode, the second drive electrode, or the sense electrode, the one or more second voltages indicative of a self capacitance of the touch node. Additionally or alternatively, in some examples, the phase of the first drive signal is opposite from the phase of the second drive signal. Additionally or alternatively, in some examples, the touch sensor is one of a plurality of touch nodes included in a touch screen of the electronic device, and the electronic device further comprises: display circuitry configured to, at a time different from a time during which the drive circuitry applies the first drive signal and the second drive signal and the sense circuitry senses the voltage of the sense electrode: apply display signals to the first drive electrode, the second drive electrode, and the sense electrode to display an image on the touch screen of the electronic device. Additionally or alternatively, in some examples, the voltage of the sense electrode is sensed during concurrent application of both the first drive signal to the first drive electrode and the second drive signal to the second drive electrode.

Some examples of the disclosure are directed to a method, comprising: at an electronic device including a touch sensor including a first drive electrode, a second drive electrode, and a sense electrode: applying, via drive circuitry of the electronic device, a first drive signal to the first drive electrode; applying, via sense circuitry of the electronic device, a second drive signal to the second drive electrode, wherein a phase of the first drive signal is different from a phase of the second drive signal; and sensing, via sense circuitry of the electronic device, a voltage of the sense electrode, the voltage indicative of mutual capacitances between the sense electrode and the first drive electrode and between the sense electrode and the second drive electrode. Additionally or alternatively, in some examples, an amplitude of the first drive signal is the same as an amplitude of the second drive signal, and a frequency of the first drive signal is the same as a frequency of the second drive signal. Additionally or alternatively, in some examples, a sum of the first drive signal and the second drive signal is substantially zero volts. Additionally or alternatively, in some examples, a mutual capacitance of a first drive electrode of a respective touch node of the touch sensor panel and a sense electrode of the respective touch node of the touch sensor panel is different from a mutual capacitance of a second drive electrode of the respective touch node of the touch sensor panel and the sense electrode of the respective touch node of the touch sensor panel. Additionally or alternatively, in some examples, at a different time from applying the first drive signal to the plurality of first drive electrodes and applying the second drive signal to the plurality of second drive electrodes, for each touch node: applying, via the drive circuitry, a third drive signal to one or more of the first drive electrode, the second drive electrode, or the sense electrode, and at a different time from sensing the voltages indicative of the mutual capacitances: sensing, via the sense circuitry, one or more second voltages of the one or more of the first drive electrode, the second drive electrode, or the sense electrode, the second voltages indicative of a self capacitance of the touch node. Additionally or alternatively, in some examples, the phase of the first drive signal is opposite from the phase of the second drive signal. Additionally or alternatively, in some examples, the touch sensor is one of a plurality of touch nodes included in a touch screen of the electronic device, and method further comprises: at a time different from a time during which the drive circuitry applies the first drive signal and the second drive signal and the sense circuitry senses the voltage of the sense electrode: applying, via display circuitry, display signals to the first drive electrode, the second drive electrode, and the sense electrode to display an image on the touch screen of the electronic device. Additionally or alternatively, in some examples, the voltage of the sense electrode is sensed during concurrent application of both the first drive signal to the first drive electrode and the second drive signal to the second drive electrode.

Some examples of the disclosure are directed to a non-transitory computer readable medium storing instructions that, when executed by an electronic device including a touch sensor including a first drive electrode, a second drive electrode, and a sense electrode, cause the electronic device to perform a method comprising: applying, via drive circuitry of the electronic device, a first drive signal to the first drive electrode; applying, via sense circuitry of the electronic device, a second drive signal to the second drive electrode, wherein a phase of the first drive signal is different from a phase of the second drive signal; and sensing, via sense circuitry of the electronic device, a voltage of the sense electrode, the voltage indicative of mutual capacitances between the sense electrode and the first drive electrode and between the sense electrode and the second drive electrode.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An electronic device, comprising:
   a touch sensor panel including one or more first drive electrodes, one or more second drive electrodes, and one or more sense electrodes, wherein the one or more first drive electrodes are surrounded by the one or more second drive electrodes; and
   drive circuitry configured to:
   apply a first drive signal to the one or more first drive electrodes; and
   apply a second drive signal to the one or more second drive electrodes, wherein a phase of the first drive signal is different from a phase of the second drive signal; and
   sense circuitry configured to:
   sense one or more voltages of the one or more sense electrodes, the one or more voltages indicative of mutual capacitances between the one or more sense electrodes and the one or more first drive electrodes and between the one or more sense electrodes and the one or more second drive electrodes.

2. The electronic device of claim 1, wherein distances between the one or more first drive electrodes and the one or more sense electrodes is different from distances between the one or more second drive electrodes and the one or more sense electrodes.

3. The electronic device of claim 1, wherein an area of the one or more first drive electrodes is the same as an area of the one or more second drive electrodes.

4. The electronic device of claim 1, wherein an amplitude of the first drive signal is the same as an amplitude of the second drive signal, and a frequency of the first drive signal is the same as a frequency of the second drive signal.

5. The electronic device of claim 1, wherein a sum of the first drive signal and the second drive signal is substantially zero volts.

6. The electronic device of claim 1, wherein one or more mutual capacitances of the one or more first drive electrodes and the one or more sense electrodes is different from mutual capacitances of the one or more second drive electrodes and the one or more sense electrodes.

7. The electronic device of claim 1, wherein:
   the touch sensor panel includes a plurality of touch nodes, each touch node included in the touch sensor panel includes a respective sense electrode of the one or more sense electrodes, a respective first drive electrode of the one or more drive electrodes, and a respective second drive electrode of the one or more second drive electrodes, the respective sense electrode is surrounded by the respective second drive electrode, and the respective second drive electrode and respective sense electrode are surrounded by the respective first drive electrode.

8. The electronic device of claim 1, wherein:

each sense electrode of the one or more sense electrodes includes a plurality of connected sense electrode segments disposed along a first dimension of the touch sensor panel, each first drive electrode of the one or more first drive electrodes includes a plurality of connected first drive electrode segments, each second drive electrode of the one or more second drive electrodes includes a plurality of connected second drive electrode segments, the plurality of connected first drive electrode segments and the plurality of second drive electrode segments are disposed along a second dimension of the touch sensor panel that is perpendicular to the first dimension, and each respective second drive electrode segment is surrounded by a respective first drive electrode segment.

9. The electronic device of claim 1, wherein:

the touch sensor panel includes a plurality of touch nodes, each touch node of a plurality of touch nodes included in the touch sensor panel includes a first drive electrode of the one or more drive electrodes, a second drive electrode of the one or more second drive electrodes, and a sense electrode of the one or more sense electrodes, the drive circuitry is further configured to, at a different time from applying the first drive signal to the one or more first drive electrodes and applying the second drive signal to the one or more second drive electrodes, for each touch node:

apply a third drive signal to one or more of the one or more first drive electrodes, the one or more second drive electrodes, or the one or more sense electrodes, and the sense circuitry is further configured to, at a different time from sensing the voltages indicative of the mutual capacitances, for each touch node:

sense one or more second voltages of the one or more first drive electrodes, the one or more second drive electrodes, or the one or more sense electrodes, the one or more second voltages indicative of self capacitances of the plurality of touch nodes.

10. The electronic device of claim 1, wherein the phase of the first drive signal is opposite from the phase of the second drive signal.

11. The electronic device of claim 1, wherein the touch sensor panel is included in a touch screen of the electronic device, and the electronic device further comprises:

display circuitry configured to, at a time different from a time during which the drive circuitry applies the first drive signal and the second drive signal and the sense circuitry senses the voltages of the one or more sense electrodes:

apply display signals to the one or more first drive electrodes, the one or more second drive electrodes, and the one or more sense electrodes to display an image on the touch screen of the electronic device.

12. The electronic device of claim 1, wherein the voltages of the one or more sense electrodes is sensed during concurrent application of both the first drive signal to the one or more first drive electrodes and the second drive signal to the one or more second drive electrodes.

13. A method, comprising:

at an electronic device including a touch sensor panel including one or more first drive electrodes, one or more second drive electrodes, and one or more sense electrodes, wherein the one or more second drive electrodes are surrounded by the one or more first drive electrodes:

applying, via drive circuitry of the electronic device, a first drive signal to the one or more first drive electrodes;

applying, via the drive circuitry of the electronic device, a second drive signal to the one or more second drive electrodes, wherein a phase of the first drive signal is different from a phase of the second drive signal; and sensing, via sense circuitry of the electronic device, one or more voltages of the one or more sense electrodes, the one or more voltages indicative of mutual capacitances between the one or more sense electrodes and the one or more first drive electrodes and between the one or more sense electrodes and the one or more second drive electrodes.

14. The method of claim 13, wherein an amplitude of the first drive signal is the same as an amplitude of the second drive signal, and a frequency of the first drive signal is the same as a frequency of the second drive signal.

15. The method of claim 13, wherein a sum of the first drive signal and the second drive signal is substantially zero volts.

16. The method of claim 13, wherein one or more mutual capacitances of the one or more first drive electrodes and the one or more sense electrode is different from one or more mutual capacitances of the one or more second drive electrodes and the one or more sense electrodes.

17. The method of claim 13, further comprising:

at a different time from applying the first drive signal to the one or more first drive electrodes and applying the second drive signal to the one or more second drive electrodes:

applying, via the drive circuitry, a third drive signal to one or more of the one or more first drive electrodes, the one or more second drive electrodes, or the one or more sense electrodes, and at a different time from sensing the one or more voltages indicative of the mutual capacitances:

sensing, via the sense circuitry, one or more second voltages of the one or more of the one or more first drive electrodes, the one or more second drive electrodes, or the one or more sense electrodes, the one or more second voltages indicative of one or more self capacitances.

18. The method of claim 13, wherein the phase of the first drive signal is opposite from the phase of the second drive signal.

19. The method of claim 13, wherein the touch sensor panel is included in a touch screen of the electronic device, and method further comprises:

at a time different from a time during which the drive circuitry applies the first drive signal and the second drive signal and the sense circuitry senses the one or more voltages of the one or more sense electrodes:

applying, via display circuitry, display signals to the one or more first drive electrodes, the one or more second drive electrodes, and the one or more sense electrodes to display an image on the touch screen of the electronic device.

20. The method of claim 13, wherein the one or more voltages of the one or more sense electrodes is sensed during concurrent application of both the first drive signal to the one or more first drive electrodes and the second drive signal to the one or more second drive electrodes.

21. A non-transitory computer readable medium storing instructions that, when executed by an electronic device including a touch sensor panel including one or more first drive electrodes, one or more second drive electrodes, and one or more sense electrodes, cause the electronic device to perform a method comprising:
- applying, via drive circuitry of the electronic device, a first drive signal to the one or more first drive electrodes;
- applying, via the drive circuitry of the electronic device, a second drive signal to the one or more second drive electrodes, wherein a phase of the first drive signal is different from a phase of the second drive signal; and
- sensing, via sense circuitry of the electronic device, one or more voltages of the one or more sense electrodes, the one or more voltages indicative of mutual capacitances between the one or more sense electrodes and the one or more first drive electrodes and between the one or more sense electrodes and the one or more second drive electrodes.

\* \* \* \* \*

UNITED STATES PATENT AND TRADEMARK OFFICE
CERTIFICATE OF CORRECTION

| | |
|---|---|
| PATENT NO. | : 11,614,839 B2 |
| APPLICATION NO. | : 16/998456 |
| DATED | : March 28, 2023 |
| INVENTOR(S) | : William Matthew Pender Paul et al. |

It is certified that error appears in the above-identified patent and that said Letters Patent is hereby corrected as shown below:

In the Claims

In Column 24, Line 26, in Claim 1, delete "wherein the one or more first drive electrodes are surrounded by the one or more second drive electrodes;" and insert -- wherein the one or more second drive electrodes are surrounded by the one or more first drive electrodes; --.

Signed and Sealed this
Sixteenth Day of May, 2023

*Katherine Kelly Vidal*

Katherine Kelly Vidal
*Director of the United States Patent and Trademark Office*